Feb. 15, 1938.    C. DA VALLE    2,108,307
TRAILER COUPLER
Filed Aug. 5, 1935    4 Sheets-Sheet 1
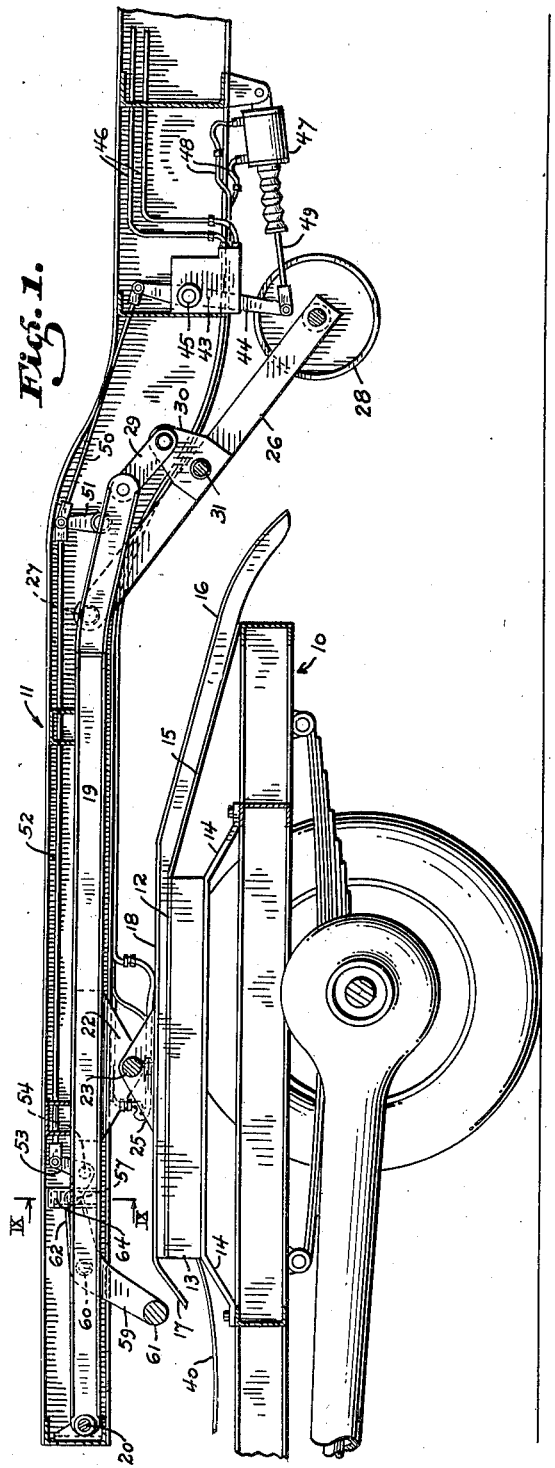
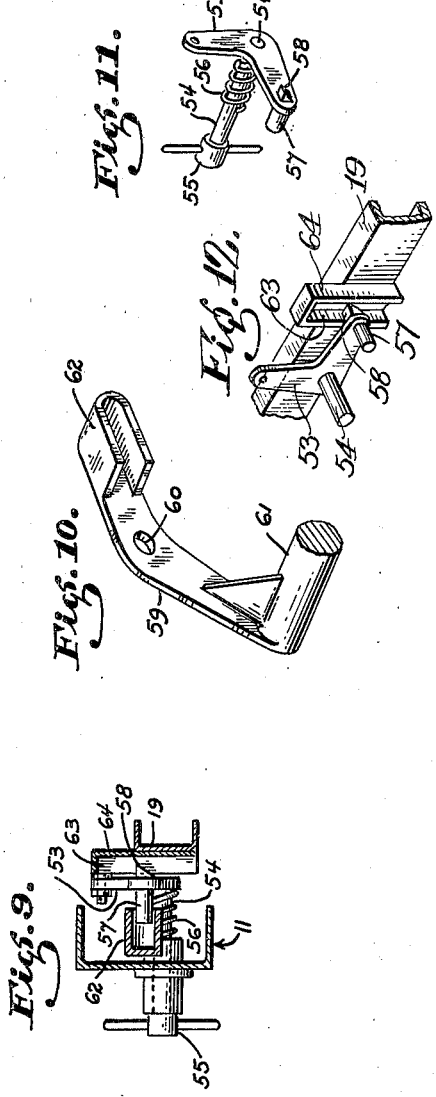
INVENTOR.
Conrad Da Valle.
BY
Chas. E. Townsend.
ATTORNEY.

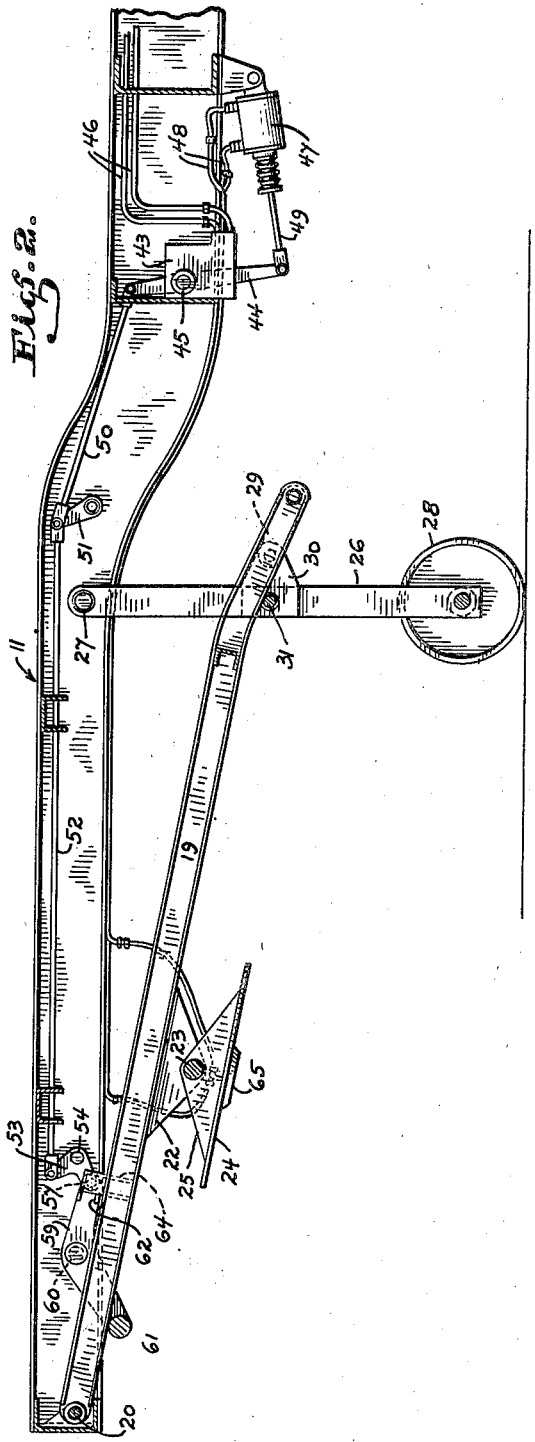

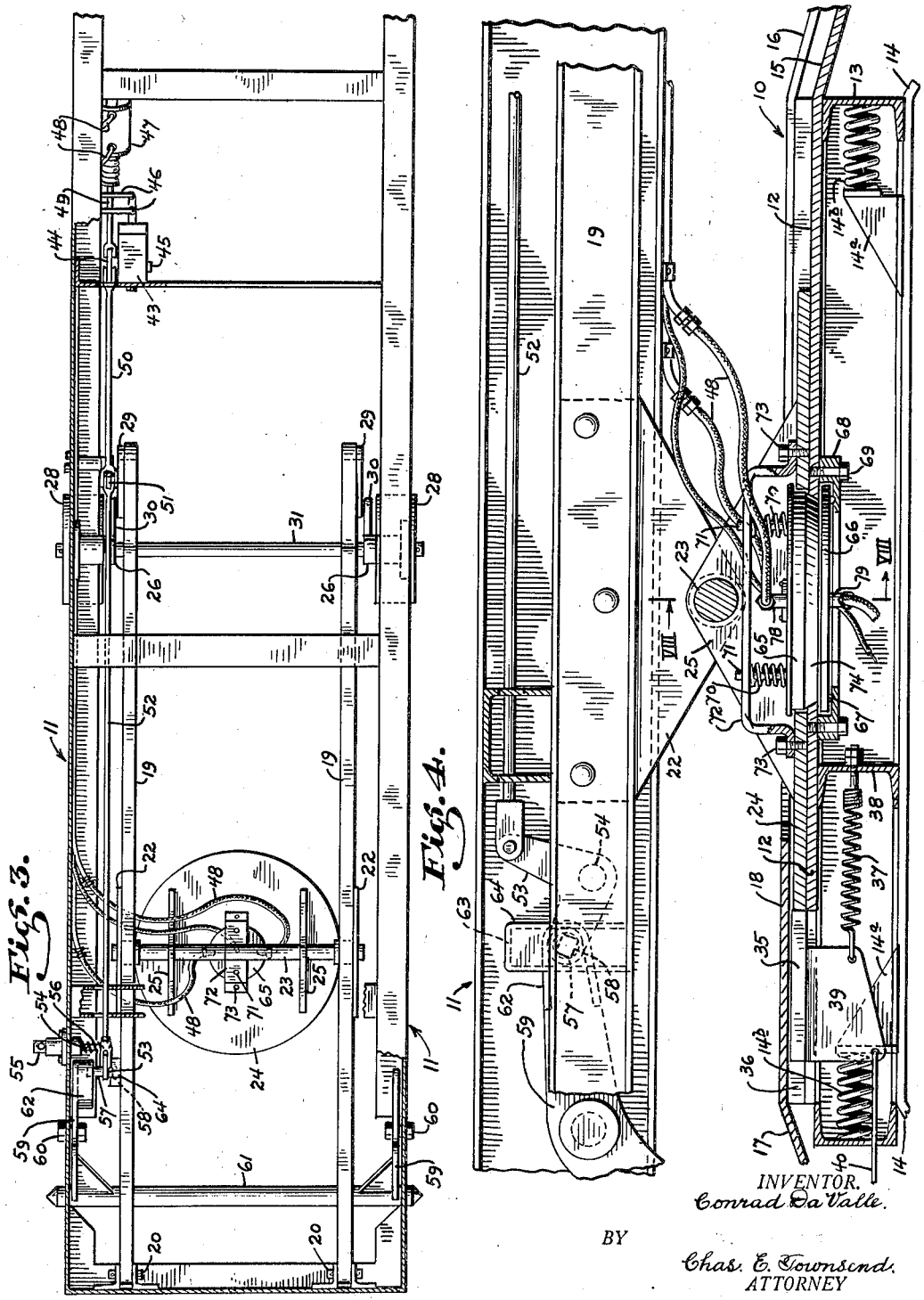

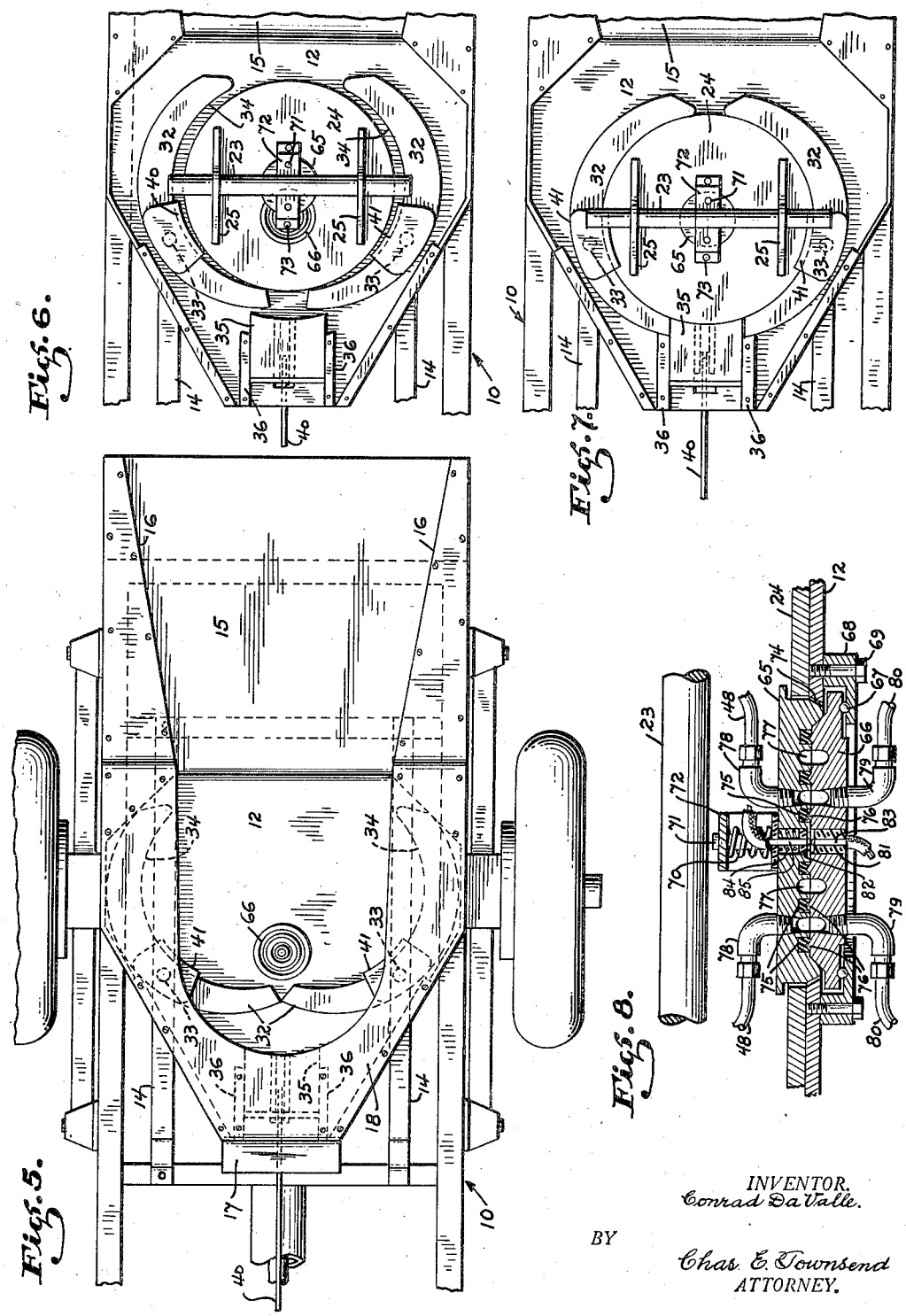

Patented Feb. 15, 1938

2,108,307

UNITED STATES PATENT OFFICE 2,108,307

TRAILER COUPLER

Conrad Da Valle, Oakland, Calif.

Application August 5, 1935, Serial No. 34,710

5 Claims. (Cl. 280—33.1)

The present invention relates to improvements in trailer couplers and particularly to couplers of the automatic or self-coupling type.

It is common practice in the transportation business to employ a number of trailers to be moved by a single truck. The truck, itself, is not necessarily equipped for carrying a load but may be used only as a tractor unit to move the trailers from place to place. This reduces the overhead cost of operating a transportation fleet, as trailers are far less expensive than trucks. Furthermore, a single driver can move several trailers from place to place where they are to be loaded or unloaded without waiting for the load to be handled, and a loaded or unloaded trailer may be temporarily stored or shipped by rail without tying up the more costly trucking unit.

It is desirable, in order that the single truck and driver may work efficiently, that the coupling and uncoupling of the trailer units be effected as quickly and easily as possible.

It is, therefore, the object of the present invention to provide a coupling device, the action of which is automatic to couple or uncouple a trailer upon movement of the truck to or away from the coupled position.

A further object of the invention is the provision in such a device of means operable automatically upon coupling and uncoupling to connect and disconnect all braking and electrical connections between the truck and trailer.

A further object is the provision of means for supporting the forward end of the trailer when it is uncoupled, and automatically operating means for moving the support to and from its supporting position, as required.

A still further object is the provision of means operable upon movement of the truck to and away from the trailer for setting the brakes of the trailer to insure the operation of the coupling mechanism and prevent accidental movement of the uncoupled trailer.

It is also an object of the invention to provide a device that is relatively simple in construction, positive in operation, and sufficiently durable to withstand all shocks and strains incident to its use.

One form of my invention is exemplified in the accompanying drawings and further of its objects and advantages are made apparent in the following detailed specification.

In the drawings,

Fig. 1 is a central longitudinal section of the rear end of a truck and the forward end of a trailer coupled thereto by mechanism constructed in accordance with my invention;

Fig. 2 is a central longitudinal section of the forward end of the trailer shown in Fig. 1, with the truck removed;

Fig. 3 is a plan view of the forward end of the trailer, as illustrated in Fig. 2, with parts shown in section;

Fig. 4 is an enlarged view, in section, of a portion of the coupling mechanism as illustrated in Fig. 1;

Fig. 5 is a plan view of the rear end of a truck, showing the coupling mechanism in position to receive the trailer;

Fig. 6 is a view, similar to Fig. 5, showing the position of the parts when the truck and trailer are moving into coupled position, the top plate being removed better to disclose the construction of the parts concealed thereby;

Fig. 7 is a similar view, illustrating the position of the parts fully coupled together;

Fig. 8 is a sectional view, taken on the line VIII—VIII of Fig. 4, showing details of construction of the coupling members for the brake and electric systems;

Fig. 9 is an enlarged section taken on the line IX—IX of Fig. 1;

Fig. 10 is an enlarged perspective view of a portion of the automatic braking system of the trailer;

Fig. 11 is a similar view of another portion of the braking system; and

Fig. 12 is a perspective view illustrating the construction of the latch plate shown in Fig. 9.

Referring particularly to Figs. 1, 2 and 3 of the drawings, I show the rearmost end of a truck chassis at 10 and the forward end of a trailer frame at 11. The truck chassis is provided with at flat coupler plate 12 supported in a suitable frame 13 which is, in turn, supported by brackets 14 resting on the chassis 10. A back apron 15, having upwardly bent side flanges 16, extends between the top of the table 12 and the rear of the chassis, and a front apron 17 slopes downwardly from the forward edge of the table 12. A cover plate 18, the shape of which is best illustrated in Fig. 5, overlies the table and forms a connecting ramp between the aprons.

The coupler plate 12 is preferably mounted in some way to cushion the shock which will be occasioned by bringing the truck and trailer into coupled position. A suitable arrangement for this purpose is illustrated in Fig. 4, wherein the frame 13, supporting the coupler plate, is shown as mounted for longitudinal sliding movement over the brackets 14. Blocks 14ª are secured to the brackets 14 and spring 14ᵇ interposed between these blocks and the end members of the frame 13 resiliently limit the longitudinal movement of the frame.

The forward end of the trailer frame 11 carries a rearwardly extending subframe 19, pivotally supported by a transverse bar 20 to swing vertically from the position illustrated in Fig. 1 to that illustrated in Fig. 2. Bracket plates 22, depending from the subframe 19, support a pivot bar 23. A disc-like coupler plate 24, or so-called "fifth wheel", swings from the bar 23, to which it is connected by means of bosses 25 extending upwardly from its top surface. The fifth wheel 24, being suspended in this manner, is in a position to be engaged by the apron 15 when the truck is backed toward the trailer. The relative movement of the truck and trailer causes the fifth wheel to ride up the apron and come to rest centrally of the plate 12, where it is properly positioned and secured by means hereinafter to be described.

To facilitate the engagement of the fifth wheel with the apron it is desirable that the fifth wheel be normally disposed at a slight angle to the horizontal as it is shown in Fig. 2 of the drawings. This angularity may be obtained by suspending the fifth wheel in an unbalanced position. To accomplish this the rearward portion of the casting may be shaped to add slightly to its weight, or the pivotal axis of the bar 23 may be disposed a short distance forward of the center of the fifth wheel.

A jack frame 26 is pivoted, as at 27, to the trailer frame and provided with wheels 28 at its lower end which rest upon the ground and support the forward end of the trailer in an elevated position when the jack frame is swung downwardly to the vertical position illustrated in Fig. 2. The rearmost end of the subframe 19 is connected to the jack frame 26 through toggle links 29 pivoted at one end to the subframe and at the other end to a bracket 30 fixed to the jack frame intermediate its ends. A bar 31 extends transversely of the jack frame intermediate its ends, and serves as a stop for the subframe to limit its downward swinging movement. The jack frame tends to fall by gravity to its vertical position. In this position the subframe rests on the bar 31 and the pivot points of the link 29 are disposed just past their position of alignment to lock the jack frame against swinging movement. Upward swinging movement of the subframe 19, which is caused by the truck moving toward the trailer to a coupling position, swings the jack frame to its uppermost position (illustrated in Fig. 1) where it is clear of the ground, as is desired when the truck and trailer are coupled together. As the truck pulls away from the trailer and the fifth wheel 24 rides down the apron 15, the jack frame again falls to its vertical position, in which it is automatically locked to support the forward end of the trailer.

The means for centering and locking the fifth wheel 24 relative to the coupler plate 12 on the truck are best illustrated in Figs. 5, 6 and 7. In these figures, a pair of arcuate jaws 32 are shown as pivoted by pins 33, which may be cast integrally with their lower surfaces, to the top surface of the plate 12. The inner curved edges 34 of the jaws 32 are of substantially the same radius as the periphery of the fifth wheel. Being mounted in this manner on the top of the plate 12, the jaws are capable of being swung to the open position illustrated in Fig. 5, where they will receive the fifth wheel as it slides up the apron 15 and onto the top plate 12. As the fifth wheel enters between the jaws 32, it strikes their inner edges (as illustrated in Fig. 6) and moves them to the final closed position (illustrated in Fig. 7) wherein a latch 35 comes into place between their ends to lock them in a closed position, surrounding and retaining the fifth wheel in its proper place on the coupler plate and thereby firmly securing the trailer to the truck by which it is to be towed. The latch 35 is mounted for sliding movement between guides 36 fixed to the top of the plate 12, and is urged forwardly to its latching position by a spring 37 (as illustrated in Fig. 4). The spring 37 is connected at one end to a cross brace 38 of the frame 13, and at the other end to a web 39 formed as a part of and extending downwardly from the latch 35. A suitable cable or rod (such as illustrated at 40) may also be connected to the web 39, and preferably extends forwardly to the cab, or driver's compartment of the truck, where it may be manipulated through any conventional type of lever (not shown) to withdraw the latch 35 from its position between the jaws 32 for the purpose of releasing the trailer.

When it is desired to release the trailer, the latch is withdrawn and the truck driven away. This causes the fifth wheel to move rearwardly relative to the truck, swinging the jaws 32 to their open position. The fifth wheel then rides down the apron 15 and the jack frame comes into position to support the forward end of the trailer in the manner already described. In order to prevent the fifth wheel from jumping out from its position of securement between the jaws 32, flanges 41 may be formed on the top surface of the jaws in a position overlying the marginal edges of the fifth wheel.

The trailer is preferably provided with vacuum-actuated, hydraulic brakes of any conventional type, which lock its wheels through the usual braking mechanism. The mechanism for controlling the trailer brakes is shown in Figs. 1, 2, 4 and 9—11. In these figures (see, particularly, Figs. 1 and 2), a conventional hydraulic reservoir and piston are illustrated as enclosed in a casing 43. The mechanism enclosed in the casing 43 forms no part of the present invention, and it will therefore suffice to say that a lever 44, disposed exteriorly of the casing, may be swung about its pivotal support 45 to vary the pressure of the hydraulic brake fluid in conduits 46, thereby setting and releasing the trailer brakes (which are not shown). A conventional vacuum-actuated piston is enclosed in a casing 47, and may be controlled by pressure in the vacuum conduits 48 to reciprocate a piston rod 49 connected to the lower end of the lever 44. The means for connecting the vacuum conduits 48 with the vacuum brake system of the truck will be set forth in detail hereinafter.

I have also provided mechanical means for operating the hydraulic brakes through the lever 44. These means comprise a brake rod 50, forming a connection between the upper end of the lever 44 and a pivoted arm 51. A similar rod 52 completes the connection to a bell crank 53, shown in Fig. 11 as supported by a pin 54 which extends through the side member of the trailer frame. A handle 55 is provided at the outer end of the pin 54 for drawing it outwardly against the tension of a spring 56. The lower arm of the bell crank is provided with a crank pin 57 which extends through the arm and terminates in the form of a latch bolt 58. Levers 59 are pivoted, as at 60, to the side frames of the trailer to support a transversely extending brake bar 61. One of the levers 59 (as illustrated in Fig. 10) is provided with an elongated socket 62, at its upper end, to receive the crank pin 57 on the bell crank 53. Upon upward swinging movement of the brake bar, the bell crank 53 will therefore be swung to a position which, through the brake rods 52 and 50 and lever 44, will cause the trailer brakes to be set.

A latch plate 63 (see Fig. 9) is carried by a bracket 64 secured to the subframe 19. The position of the latch plate 63 is such that if the subframe is lowered at the time that the brakes are set, the latch bolt 58 will snap into position below the latch plate to prevent release of the brakes. Thus the brakes normally will be set when the trailer is uncoupled, but in the event that it is desired to move the trailer a short distance without coupling a truck to it, the brakes may be released by pulling outwardly on the handle 55 to withdraw the latch dog 58 from beneath the latch plate 63.

Through the mechanism above described, the trailer brakes are automatically set upon both the coupling and uncoupling operations. When the truck is backed toward the trailer to be coupled thereto, and assuming that the trailer brakes may have been released, the apron 15 strikes the brake bar 61, raising it up to set the brakes of the trailer and prevent its rolling away from the truck during the coupling operation. As the subframe 19 is raised, the latch plate 63 is moved to a position where it will not cooperate with the latch dog to lock the brakes. Consequently, when the brake bar rides down the apron 17, during the final stage of the coupling operation, the brakes are released. When the truck and trailer are to be uncoupled, the initial forward movement of the truck causes the apron 17 to strike and raise the brake bar to set the brakes. As the truck continues to move away from the trailer, the subframe 19 falls to its lower position, bringing the latch plate 63 into the position illustrated in Fig. 2, where it will cooperate with the latch dog 58 to effect permanent locking of the trailer brakes.

In order that the coupling and uncoupling operations may be entirely automatic, I have provided mechanism (as shown in Figs. 4 and 8) for connecting the vacuum lines of the truck and trailer, as well as the electric wiring of the two. The fifth wheel 24 and plate 12 upon which it rests are centrally perforated to receive disc-shaped coupling members 65 and 66. The lowermost coupling member 66 is supported for necessary turning movement on ball bearings 67, a race for which is milled in an annular bracket 68 of angular cross section, secured to the bottom of the plate 12 as by bolts 69. The upper coupling member 65 is normally pressed downwardly by springs 70 surrounding pins 71 guided for vertical movement through a bracket 72 which extends across the coupling member and is secured to the fifth wheel at its ends by bolts 73. The lower edges of the member 65 are beveled, as at 74, so that, as the fifth wheel rides over the plate 12 to the position where the coupling members register with each other, it will be pressed downwardly into close contact with the lower coupling member 66. The edges of the openings in the plate 12 are similarly beveled so that when the truck and trailer are uncoupled, the coupling member 65 will ride out of the perforation.

The contacting faces of the coupling members 65 and 66 are provided with complementary gaskets 75, ridges 76 and annular grooves 77 to form separate sealed annular chambers through which the vacuum connections may be made. Fittings 78 communicate with these chambers through the coupling member 65 and with the conduits 48 of the trailer vacuum system. Similar fittings 79 communicate with the grooves 77 and with conduits 80 of the truck vacuum system. The conduits 80, adjacent the fittings 79, are preferably sufficiently flexible to permit slight rotary movement of the coupling member 66 on its bearings 67 which will necessarily occur when the coupled truck and trailer round a corner.

In order to form a connection between the electrical system of the truck and the electric lighting wires of the trailer, the coupling members 65 and 66 are centrally bored. This boring of the member 66 receives a dielectric plug 81 which supports a contact member 83, which may be connected with the lighting circuit of the truck. The central boring of the coupling member 65 slidably receives a dielectric plunger 82 supporting a contact member 85 in a position to engage the contact member 82. A coil spring 84 is provided behind the plunger 82 to urge the contact members into close engagement.

The electrical connection here shown is designed for a one-wire lighting circuit where a ground is made through the framework of the truck and trailer. However, if a two-wire circuit is desired or if separate circuits are to be used for tail-lights and stop-lights, the contact members 82 and 83 may be replaced by conventional, concentrically spaced collector rings so that any desired number of circuits may be operated through the coupling.

Through the mechanism described above, the coupling and uncoupling operations are automatic to the extent that they can be performed by one man driving the truck. Furthermore, it is never necessary for the driver to leave his seat in the driving compartment. When the truck and trailer are to be coupled, he merely backs the truck into the trailer, thus removing the jack frame from beneath the trailer, forming a positive coupling, releasing the trailer brakes, and connecting the braking and electric systems of the truck and trailer. To uncouple the trailer, the truck driver merely operates the lever which withdraws the latch 35; the truck is then driven away from the trailer, the jack frame automatically swings to its supporting position where it is securely locked, and the brakes of the trailer are set and locked.

As the several automatic functions described above take place either simultaneously or in rapid succession, less than two seconds' time is required for either the coupling or uncoupling operations.

While I have illustrated and described a specific form of my invention, it is to be understood that various changes may be resorted to in the construction and arrangement of its several parts within the scope of the appended claims.

What I claim is:

1. In a trailer coupler, a plate adapted to be supported on a truck, a fifth wheel carried by the trailer and slidable over said plate, a pair of pivoted jaws on the plate engageable by the fifth wheel to bring them to a clamping position relative thereto and flanges on said jaws overlying the edges of the fifth wheel to prevent vertical movement thereof when it is surrounded by the jaws.

2. In combination with a truck and trailer having a coupler member comprising cooperating coupling elements and an inclined apron on the truck to receive and guide the coupler element of the trailer into coupled position, brakes on the trailer, and a brake control bar depending from the trailer and engageable with said apron to set the trailer brakes before the coupling elements engage each other.

3. In combination with a truck and trailer having a coupler member comprising cooperating coupling elements and an inclined apron on the truck to receive and guide the coupler element of the trailer into coupled position, brakes on the trailer, and a brake control bar depending from the trailer and engageable with said apron to set the trailer brakes before the coupling elements engage each other, said brake control bar serving to support the load of the trailer from the time it contacts the apron until the coupling elements engage each other.

4. In combination with a coupler for a truck and trailer, a jack frame pivoted to the trailer, a subframe pivoted to the trailer forwardly of the jack frame pivot, said subframe carrying the trailer coupler member whereby it will be raised and lowered upon coupling and uncoupling of the trailer and extending rearwardly of the jack frame pivot, and a link connecting the rear end of the subframe with the jack frame to cause the jack frame to be raised and lowered with the subframe.

5. In combination with a coupler for a truck and trailer, a jack frame pivoted to the trailer, a subframe pivoted to the trailer forwardly of the jack frame pivot, said subframe carrying the trailer coupler member whereby it will be raised and lowered upon coupling and uncoupling of the trailer and extending rearwardly of the jack frame pivot, a link connecting the rear end of the subframe with the jack frame to cause the jack frame to be raised and lowered with the subframe, and means on the jack frame limiting the downward movement of the subframe at a point where said link will prevent swinging movement of the jack frame in either direction.

CONRAD DA VALLE.